Sept. 23, 1958 R. C. WALTER ET AL 2,853,165
MAGNETIC FRICTION TORQUE APPLYING APPARATUS
Filed July 20, 1955
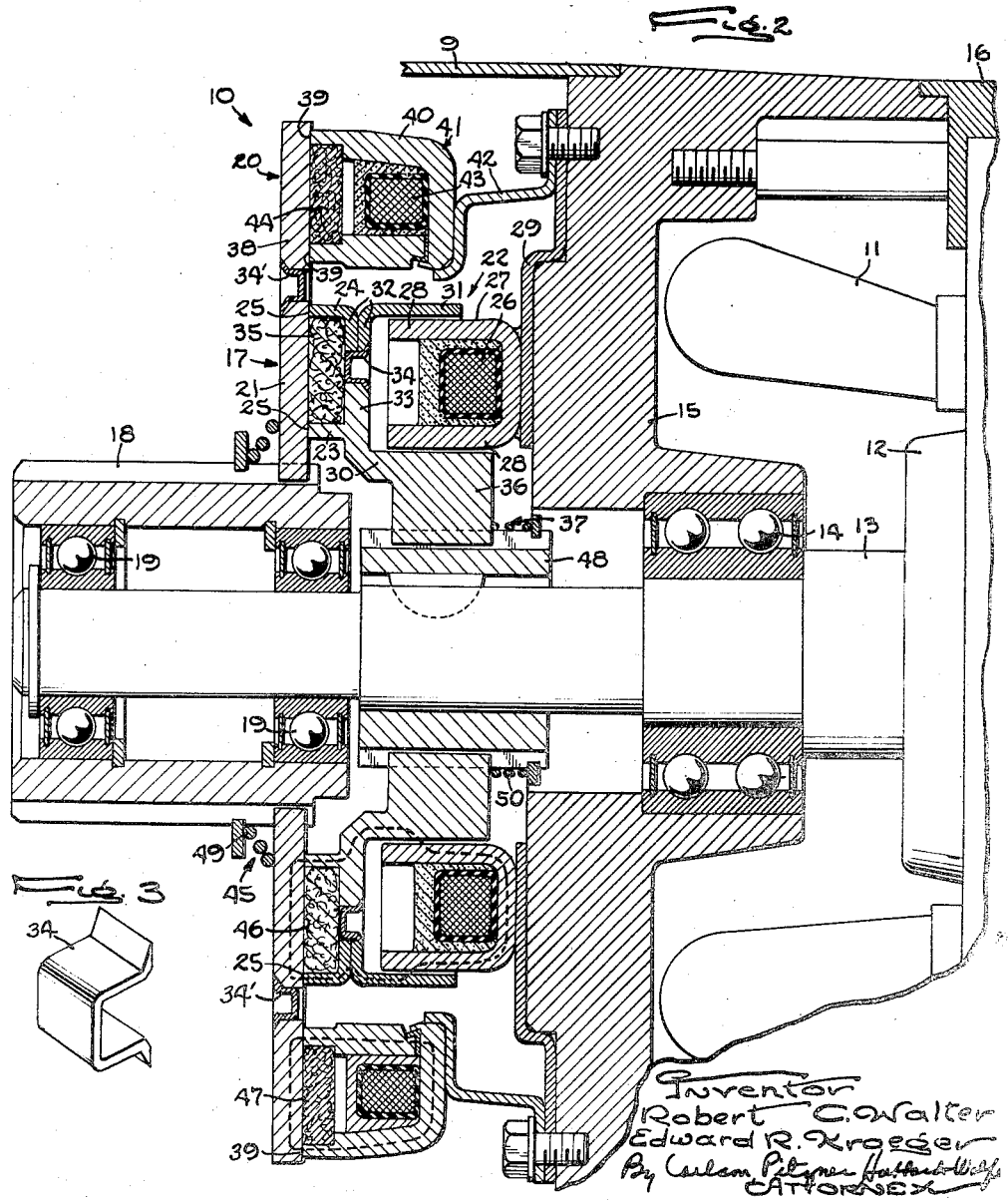

United States Patent Office 2,853,165
Patented Sept. 23, 1958

2,853,165

MAGNETIC FRICTION TORQUE APPLYING APPARATUS

Robert C. Walter and Edward R. Kroeger, Beloit, Wis., assignors to Warner Electric Brake & Clutch Company, South Beloit, Ill., a corporation of Illinois Application July 20, 1955, Serial No. 523,268

5 Claims. (Cl. 192—18)

This invention relates generally to a magnetic friction clutch and brake unit and, more particularly, to a clutch and brake unit adapted to be mounted on one end of the casing of a motor for appling a driving or a retarding torque to the motor output shaft.

The general object of the invention is to provide a clutch and brake unit of the above character having extreme axial compactness and minimum numbers of parts and mountings for the same.

Another object is to achieve axial compactness of the clutch and brake unit by a novel construction of the armatures and the magnets of the clutch and the brake enabling the two friction devices to be mounted concentrically with each other substantially in a common plane.

A further object is to simplify the mounting of the parts of the two friction devices by securing the armatures together as a rigid unit while still maintaining intimate axial contact of the frictionally engaging parts of both devices in spite of wearing off of such parts in service use.

Other objects and advantages of the invention will become apparent from the following detailed description taken in connection with the accompanying drawings, in which Figure 1 is an elevational view partly in section of a motor and a clutch and brake unit embodying the novel features of the present invention.

Fig. 2 is a fragmentary diametrical cross sectional view of the motor and the torque unit.

Fig. 3 is a perspective view of a clip used to secure the armatures rigidly together.

In the drawings, the invention is shown for purposes of illustration embodied in a torque unit 10 which is especially adapted for use with an electric motor having a stationary field winding 11 and a rotor 12 fast on a shaft 13 journaled in bearings 14 carried by the end bells 15 of the motor casing 16. The torque unit 10 is mounted on one end bell 15 within a housing 9 on the latter and includes a magnetic friction clutch 17 for transmitting torque from the rotor or driving shaft 13 to an output or driven shaft 18 in the form of a sleeve disposed on the outer side of the end bell and journaled on bearings 19 carried by the driving shaft. A retarding torque is applied to the output shaft by a magnetic friction brake 20.

The clutch 17 comprises generally a flat armature ring 21 of magnetic material rotatable with the output shaft 18 and an annular core 22 of magnetic material of channel cross section having radially spaced concentric pole pieces 23 and 24. The latter are rotatable with the driving shaft 13 and terminate in axially facing pole faces 25 opposing and adapted for frictional gripping engagement with the armature 21 upon energization of an annular multiple turn winding 26 disposed within and secured to the core 22. To avoid collector rings for conducting current to the winding 26, it is preferred to secure the pole pieces 23 and 24 rigidly together as a unit which is magnetically connected but is rotatable with the driving shaft 13 relative to a stationary core part 27 carrying the winding. In this instance, the stationary part 27 of the clutch core 22 is a ring of channel cross section concentric with the rotor shaft 13 and having radially spaced cylindrical pole rings 28 straddling the winding and secured thereto by a suitable hardened cement. An annular plate 29 bolted to the exterior of the end bell 15 of the motor is welded to the channel 27 to support the same stationarily.

The magnetic connection between the stationary part 27 of the clutch core 22 and the relatively rotatable pole pieces 23 and 24 is formed by cylindrical inner and outer extensions 30 and 31 of the pole pieces overlapping axially and telescoping closely with the respective stationary pole rings 28. Herein, each of the outer pole piece 24 and its extension 31 is stamped from sheet metal as a cylindrical ring with an inturned flange 32 which abuts and is secured to the flange of the other ring as by spot welding. The inner pole piece 23 and its extension 30 are formed as an integral machine casting with the extension offset radially and inwardly from the inner pole piece and with an annular flange 33 projecting radially and outwardly from the inner end of the pole piece. This flange is secured rigidly to but magnetically separated from the flanges 32 of the outer pole piece 24 and its extension 31 by a plurality of U-shaped clips 34 formed of a nonmagnetic material such as stainless steel and welded to the respective flanges, one of these clips being shown in Fig. 3 as it appears after being welded to the flanges. Seated against the latter and secured between the pole pieces is a ring 35 of suitable wear resistant friction material. An inwardly projecting annular flange 36 integral with the inner extension 30 is connected to the driving shaft 13 by a coupling 37 for rotation of the pole pieces with the shaft.

Like the clutch armature 17, an armature 38 for the brake 20 is formed in this instance as a flat annular plate of magnetic material spanning and adapted for frictional gripping engagement with axially facing concentric pole faces 39 formed on the ends of radially spaced cylindrical pole pieces 40 of a brake magnet core 41. The latter is formed of magnetic material of channel cross section having an end ring spanning and rigid with the other ends of the pole pieces 40 and is connected to the motor end bell 15 by a coupling 42 which holds the core against rotation relative to the end bell. Upon energization of a multiple turn annular winding 43 seated in cement between the pole pieces and against the end ring, the flux produced thereby threads a toroidal path extending around the channel, radially through the armature, and axially back and forth between the pole faces and the armature as indicated by the dotted line in Fig. 2 to draw the armature into gripping engagement with a composite friction face defined by the pole faces and a ring 44 of wear resistant friction material seated between the pole pieces.

To simplify the mounting of the armatures 21 and 38 and attain extreme axial compactness of the torque unit 10, the present invention contemplates securing the armatures rigidly together as a unitary assembly with one armature disposed concentrically within the other and lying substantially in a common plane therewith. This permits the two armatures to be connected to the output shaft 18 for rotation therewith by a single coupling 45 and enables the magnet cores 22 and 41 to be arranged in a similar concentric relation, one within the other in a common plane, on the same side of the armatures. Thus, the two friction devices 17 and 20 occupy a space of approximately the same axial length as either one of the devices alone, the flat friction faces 46 and 47 of the armatures and the coacting pole faces 25 and 39 of the magnet cores preferably lying flush with each other in a common plane thereby contributing to the axial compactness of the unit. In the present instance, the armatures 21 and 38 are formed as flat annular disks of the same axial thickness secured together by a plurality of U-shaped metal clips 34' similar to the pole piece clips 34 spaced angularly around the armature rings between the same and having laterally spaced legs welded to the respective rings. The clips 34' are formed of a non-magnetic material like the pole piece clips 34 and thus are of high reluctance so as to separate the armature rings magnetically and thereby isolate the magnetic circuits of the clutch and brake from each other.

The rigid mounting of one of the armatures 21 and 38 on the other is made possible by a novel construction of the couplings 37, 42, and 45 for relative axial floating of the coacting friction parts of each of the clutch 17 and the brake 20 into and out of contact with each other thereby insuring intimate axial contact of these parts as they wear off in service use. While such floating of the brake armature 38 and pole pieces 40 may be obtained by constructing the coupling 42 for axial floating of the brake core 41 relative to the motor end bell 15, it is preferred that the armature float axially relative to the output shaft 18. Thus, the coupling 45 may comprise a simple spline connection between the output shaft and the inner periphery of the inner armature ring 21 while the coupling 42 secures the brake core 41 rigidly to the end bell. Herein, the brake core coupling 42 comprises an annular plate welded to the end ring of the brake core and bolted to the end bell.

To obtain relative axial movement of the friction parts of the clutch 17 into and out of axial contact when the brake armature 38 and pole faces 39 are in contact, the clutch pole pieces 23 and 24 are slidable axially relative to the driving shaft 13. Herein, the coupling 37 providing such movement comprises a sleeve 48 keyed to the shaft and splined to the inwardly projecting flange 36 on the extension 30 of the inner pole piece 23. Such a simple mounting of the clutch parts on the driving shaft 13 is facilitated by making the clutch 17 the inner one of the concentric friction devices thereby locating the rotating parts close to the shafts 13 and 18. In addition to simplifying the clutch mounting, arrangement of the brake 20 outside of the clutch makes the larger effective radius of the two friction devices available for application of the braking force so as to insure effective stopping of the output shaft. If desired, a light spring 49 may be interposed between the inner armature ring 21 and the output shaft as shown to urge the outer armature toward the brake pole faces and maintain the same in light running contact. Similar contact between the clutch pole pieces 23 and 24 and the inner armature preferably is obtained by a spring 50 acting between the coupling sleeve 48 and the inner pole piece flange 36 to urge the pole pieces axially toward and against the inner armature.

In the operation of the improved torque unit 10 described above, the brake 20 is applied to stop the output shaft 18 by energization of the brake winding 43 which produces a flux threading the toroidal path described above to draw the armature into axial gripping engagement with the pole faces. During such engagement, the clutch pole pieces 23 and 24 are urged into light running contact with the inner armature 21. Energization of the clutch winding 26 produces a flux threading a toroidal path extending around the stationary core 27, radially across the running air gaps between the stationary pole rings 28 and the extensions 30 and 31 of the rotating pole pieces 23 and 24, axially through the latter and back and forth between the inner armature and the pole faces 25, and radially through the armature as shown by a dotted line in Fig. 2 to draw the same into gripping engagement with the pole faces.

By virtue of the relative axial floating of the friction parts of each of the clutch 17 and the brake 20, these parts may contact and grip each other axially to produce the desired torque in spite of wearing off of their interengaging surfaces. Thus, as the faces 47 and 39 of the brake armature 38 and pole pieces 40 wear off, the armature may shift axially relative to the output shaft and toward the pole faces. Similarly, wearing off of the faces 46 and 25 of the clutch armature 21 and pole faces 25 is compensated for by axial shifting of the clutch pole pieces 23 and 24 relative to the driving shaft 13 and toward the armature. Such floating enables the two armatures to be secured together rigidly so that the inner armature 21 may serve as a part of the connection between the outer armature 38 and the output shaft 18 and correspondingly reduce the number of mounting parts required for the two devices. With the armatures disposed concentrically in a common plane, the magnet cores 22 and 41 may be similarly arranged to locate the brake 20 within the axial confines of the clutch 17 and thereby achieve extreme overall compactness of the torque unit.

We claim as our invention:

1. The combination of, a stationary support, driving and driven members mounted for rotation relative to said support about a common axis, a rigid annular armature unit coaxial with said members and comprising inner and outer flat concentric rings of magnetic material and means securing the rings together and having a high reluctance so as to separate the rings magnetically from each other, said rings providing flush friction faces lying substantially in a common plane and facing axially in the same direction, a brake magnet having an annular core of magnetic material secured to said support and providing radially spaced axially facing friction faces spanned by and adapted for axial gripping engagement with said face of said outer ring, a clutch magnet comprising an annular core of magnetic material disposed within and concentric with said brake core and having fixed and rotatable telescoping parts, means securing said fixed clutch part to said support, said rotatable part providing radially spaced pole pieces with axially facing pole faces spanned by and adapted for axial gripping engagement with said face of said inner armature ring, and means mounting said armature unit and said rotatable part on said driven and driving members respectively for rotation therewith and for axial floating movement relative to each other and said support whereby to permit movement of said outer ring into and out of contact with said brake faces and said inner ring and said clutch faces into and out of contact with each other in spite of wearing off of the faces in service use.

2. The combination of, a stationary support, driving and driven members mounted for rotation relative to said support about a common axis, a rigid annular armature unit coaxial with said members and comprising inner and outer flat concentric rings of magnetic material and means securing the rings together and having a high reluctance so as to separate the rings magnetically from each other, said rings providing flush friction faces lying substantially in a common plane and facing axially in the same direction, a brake magnet having an annular core of magnetic material secured to said support and providing radially spaced axially facing friction faces spanned by and adapted for axial gripping engagement with said face of a first one of said rings, a clutch magnet comprising an annular core of magnetic material concentric with said brake core in a common plane and having fixed and rotatable telescoping parts, means securing said fixed clutch part to said support, said rotatable part providing radially spaced pole pieces with axially facing pole faces spanned by and adapted for axial gripping engagement with said face of the other of said rings, and means mounting said armature unit and said rotatable part on said driven and driving members respectively for rotation therewith and for axial floating movement relative to each other and said support whereby to permit movement of said first ring into and out of contact with said brake faces and said other ring and said clutch faces into and out of contact with each other in spite of wearing off of the faces in service use.

3. The combination of, a fixed support, a magnetic friction brake including a non-rotatable annular core of magnetic material of channel cross section secured to said support and having radially spaced pole pieces terminating in annular axially facing pole faces, a magnetic friction clutch having an annular core of magnetic material of channel cross section smaller than and concentric with said brake core and disposed within the latter, said clutch core having radially spaced pole pieces terminating in pole faces facing axially in the same direction as said brake faces, inner and outer armature rings of magnetic material spanning and adapted for frictional gripping engagement respectively with said clutch pole faces and said brake pole faces, means securing said rings rigidly together in concentric relation and being of high reluctance thereby magnetically separating the rings from each other, means supporting said armature rings for rotation relative to said support about the axis of said cores and for axial floating to permit said outer ring to move into and out of contact with said brake faces, and means supporting said clutch pole pieces for rotation about said axis and for axial floating movement into and out of contact with said inner armature ring, the mounting of said rings and the cooperating friction parts of each of said clutch and brake for floating movement axially relative to each other providing intimate axial contact of such parts and the rings in spite of wearing off of the same in service use.

4. The combination of, a fixed support, driving and driven members mounted for rotation relative to said support about a common axis, a magnetic friction brake including a non-rotatable annular core of magnetic material of channel cross section concentric with said driving member and having radially spaced pole pieces terminating in annular axially facing pole faces, a magnetic friction clutch having an annular core of magnetic material of channel cross section concentric with and lying in a common plane with said brake core, said clutch core having radially spaced pole pieces terminating in pole faces substantially flush with and facing axially in the same direction as said brake faces, inner and outer armature rings of magnetic material, means securing said rings together in concentric relation to form a rigid unit and having a high reluctance so as to separate the rings magnetically, said rings providing flat axially facing friction faces lying substantially flush with each other in a common plane and spanning and adapted for frictional gripping engagement respectively with said clutch pole faces and said brake pole faces, means coupling said unit and said brake core respectively to said driven member and said support for rotation of the unit with the driven member about said axis and for relative axial floating of the core and the unit to permit movement of said faces of the core and one of said rings into and out of axial gripping engagement, and means coupling said clutch pole pieces to said driving member for rotation therewith about said axis and for axial floating movement into and out of contact with the other of said armature rings whereby to maintain said faces of both of said cores in intimate axial contact with the coacting faces of the rings in spite of wearing off of the faces in service use.

5. The combination of, a stationary supporting member, driving and driven members mounted for rotation about a common axis, a rigid armature unit comprising a pair of flat concentric rings of magnetic material and means securing the rings together but magnetically being of high reluctance so as to separate the rings from each other, a brake magnet having a non-rotatable annular core of magnetic material coaxial with said driving and driven members and providing radially spaced axially facing pole faces spanned by and adapted for axial gripping engagement with one of said rings, a clutch magnet having an annular core of magnetic material concentric with said brake core and including radially spaced pole pieces terminating in axially facing pole faces spanned by and adapted for axial gripping engagement with the other of said rings, means coupling said armature unit and said pole pieces to said driven and driving members respectively for rotation therewith and coupling the armature unit and said magnets to the driving and driven members and said supporting member for relative axial floating movement of each of said rings and the cooperating pole faces of the magnets whereby to maintain the faces and rings in intimate axial contact in spite of wearing off of these parts in service use.

References Cited in the file of this patent

UNITED STATES PATENTS 2,659,830     Mason et al.   ----------- Nov. 17, 1953